(12) United States Patent
Kapitanski et al.

(10) Patent No.: US 7,269,583 B2
(45) Date of Patent: Sep. 11, 2007

(54) SYSTEM AND METHOD FOR VERIFYING CONVERTED DATABASE COMMANDS

(75) Inventors: Boris Kapitanski, West Hills, CA (US); Alex Sidorenko, Canoga Park, CA (US)

(73) Assignee: Serena Software, Inc., San Mateo, CA (US)

( * ) Notice: Subject to any disclaimer, the term of this patent is extended or adjusted under 35 U.S.C. 154(b) by 0 days.

(21) Appl. No.: 11/168,245

(22) Filed: Jun. 27, 2005

(65) Prior Publication Data

US 2005/0240565 A1 Oct. 27, 2005

Related U.S. Application Data

(63) Continuation of application No. 10/112,883, filed on Mar. 29, 2002, now Pat. No. 6,912,539.

(51) Int. Cl.
*G06F 17/30* (2006.01)

(52) U.S. Cl. .......................... 707/1; 707/202; 707/203

(58) Field of Classification Search .................... None
See application file for complete search history.

(56) References Cited

U.S. PATENT DOCUMENTS

| | | | | |
|---|---|---|---|---|
| 5,812,840 | A * | 9/1998 | Shwartz | 707/4 |
| 6,151,608 | A * | 11/2000 | Abrams | 707/204 |
| 6,226,649 | B1 * | 5/2001 | Bodamer et al. | 707/104.1 |
| 6,631,382 | B1 * | 10/2003 | Kouchi et al. | 707/102 |
| 6,651,072 | B1 * | 11/2003 | Carino et al. | 707/104.1 |
| 6,721,769 | B1 * | 4/2004 | Rappaport et al. | 707/205 |
| 6,912,539 | B1 * | 6/2005 | Kapitanski et al. | 707/101 |

* cited by examiner

*Primary Examiner*—Debbie Le
(74) *Attorney, Agent, or Firm*—Innovation Partners; Charles E. Gotlieb (57) ABSTRACT

A system and method converts database commands from one language and dialect to another and verifies the results of the conversion. If the results are accurate, changes may be committed to the database and otherwise, changes may be rolled back.

39 Claims, 4 Drawing Sheets

SYSTEM AND METHOD FOR VERIFYING CONVERTED DATABASE COMMANDS

RELATED APPLICATION

This application is a continuation of U.S. application Ser. No. 10/112,883, entitled, "Method and Apparatus for Verifying Converted Database Commands" filed on Mar. 29, 2002 now U.S. Pat. No. 6,912,539 by Boris Kapitanski and Alex Sidorenko, having the same assignee as the present application, and is hereby incorporated by reference in its entirety.

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF THE INVENTION

The present invention is related to computer software and more specifically to computer database software.

BACKGROUND OF THE INVENTION

Conventional database programs process queries and other database commands. Many conventional database programs use a command language to allow a user or a program to supply commands to the database program, and the database program executes the command and may return a result. Many conventional database programs use a standard command language such as the Structured Query Language known as SQL. The SQL standard is specified by the American National Standards Institute, known as ANSI. One of the benefits of database programs that accept commands written in ANSI SQL or other standard command language is the ability of a command written for a database program provided by one supplier to be executed by a database program provided by a different supplier, provided only the ANSI-compliant commands are used.

Some database programs use a variation of SQL that differs from the ANSI standard. For example, a portion of the command may be the same as the ANSI SQL commands, but the format of the commands (e.g. the way parameters are specified) may be different from one database program to the next. Additionally, each database program may allow additional commands to be used that are not part of the standard command language. Thus, although some database programs speak a language that has much in common with other databases or a standard language, each may speak a variation of the language, referred to herein as a dialect. Commands written for one database program in one dialect will not operate in a database program that uses a different dialect.

It can be desirable to convert data from a format for use by one database program into the format for use by another database program. A new database program may contain desirable features that are not supported by the old database program. However, if the commands written for the old database program are not compatible with the commands that produce the same result in the new database program, the commands must be converted from a language and/or dialect of the old database program to a language and/or dialect of the new database program.

Although it is possible to write automated command converters to convert a command written for one database program to work on a different database program, because of the wide variety of data and commands and the potential for different interpretation of the same command by different database programs, it can be difficult to write a converter that will take into account every nuance of the command language of each database program. This task is made more difficult by the rapidly changing nature of some database commands, and commands that are either poorly documented or not documented at all, with users discovering these commands through word of mouth and trial and error techniques. Thus, the conversion process would require a manual comparison process, where the results of the command executed by the old database program would be compared against the results of the converted command executed by the new database programs.

Although it is also possible to write programs that compare the result of the command and the converted command executed by the old and the new database program, respectively, some differences between the result sets may be acceptable. Thus, even with the use of a converter, the results of the commands executed by the new database program and old database program, must be manually checked against one another to determine whether the command has been properly converted. If the results are different from the old database to the new (with the same data being used for comparison purposes), the user or programmer can make corrections to the converted command to provide the same result or a result that only contains acceptable differences, such as differences in the order of rows. Thus, even though the command may be automatically converted, the verification of the results remains a tedious and error-prone process.

If the commands are part of an application program, it can sometimes be faster and more accurate to simply rewrite the one or more commands in the language and dialect of the new database program from scratch. Therefore, although there has long been a need for automated converters, the practical application of automated converters that convert commands for use by one database program into commands that can be used by another database program have been limited because of lack of confidence in the converters requires a tedious and error-prone verification process.

Another problem with such converters is that the execution of a command for test purposes can alter the data in the database. Although the data from the database may be duplicated into a test version of the database, sufficient storage may not be available to allow the database to be duplicated, or the duplication process may itself be too time consuming to be repeatedly performed in the process of testing and correcting the converted commands. Thus, testing the converted commands on a duplicate copy of the data in the database may be impractical.

What is needed is a system and method that can convert one or more commands for use on one database program for use on one or more different database programs and ensure the results of the converted command are the same, or contain only acceptable differences, without requiring the data in the database to be altered upon completion of the command and without requiring a copy of the database to be used.

SUMMARY OF INVENTION

A system and method copies or converts one or more commands written for one use by one database program into one or more commands that can be used by one or more different database programs. The system and method provides the converted commands to the user for confirmation and optional alteration. The system and method then provides the converted commands for execution by a database program and checks the results produced by each of the one or more commands when executed by their respective database program or programs. If the results are the same, the changes may be committed to the database, and otherwise, the database is "rolled back" to eliminate the effect of the command. If the results are the same except for the order of the result or other acceptable differences, the user can decide whether to commit the results to the database or roll them back.

DETAILED DESCRIPTION OF A PREFERRED EMBODIMENT

Figure 1:
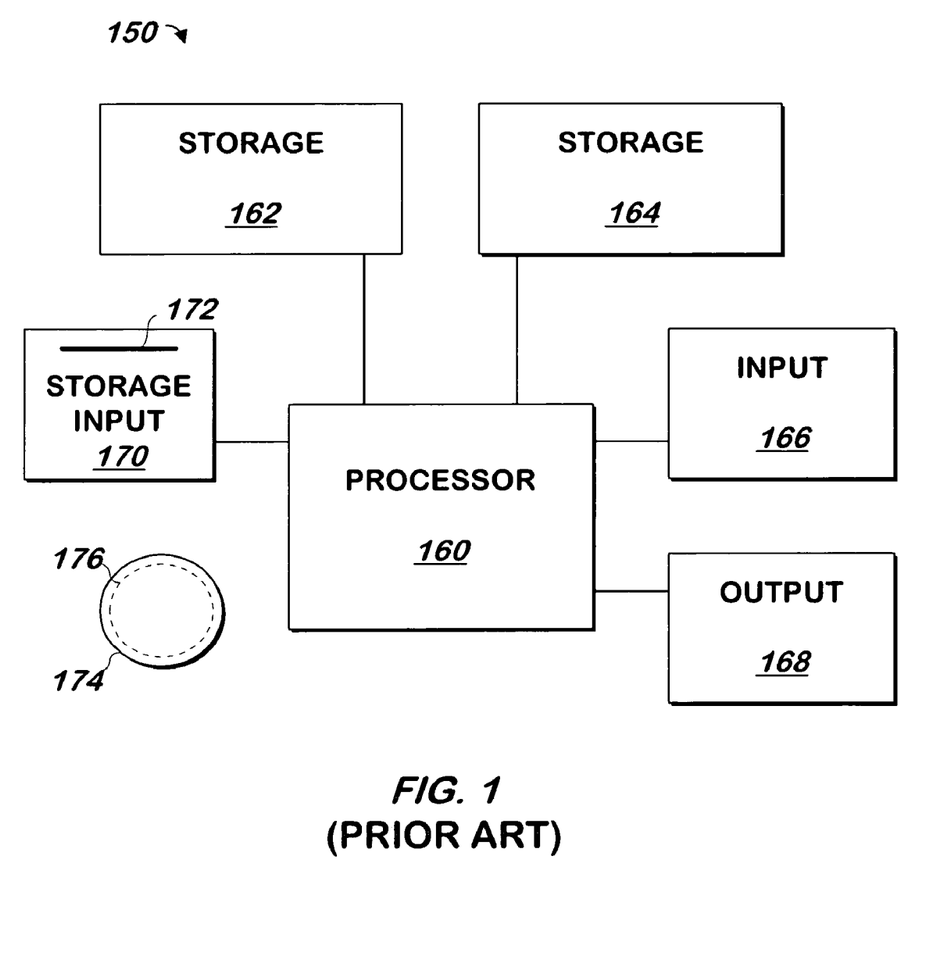
FIG. 1 is a block schematic diagram of a conventional computer system.

The present invention may be implemented as computer software on a conventional computer system. Referring now to FIG. 1, a conventional computer system 150 for practicing the present invention is shown. Processor 160 retrieves and executes software instructions stored in storage 162 such as memory, which may be Random Access Memory (RAM) and may control other components to perform the present invention. Storage 162 may be used to store program instructions or data or both. Storage 164, such as a computer disk drive or other nonvolatile storage, may provide storage of data or program instructions. In one embodiment, storage 164 provides longer term storage of instructions and data, with storage 162 providing storage for data or instructions that may only be required for a shorter time than that of storage 164. Input device 166 such as a computer keyboard or mouse or both allows user input to the system 150. Output 168, such as a display or printer, allows the system to provide information such as instructions, data or other information to the user of the system 150. Storage input device 170 such as a conventional floppy disk drive or CD-ROM drive accepts via input 172 computer program products 174 such as a conventional floppy disk or CD-ROM or other nonvolatile storage media that may be used to transport computer instructions or data to the system 150. Computer program product 174 has encoded thereon computer readable program code devices 176, such as magnetic charges in the case of a floppy disk or optical encodings in the case of a CD-ROM which are encoded as program instructions, data or both to configure the computer system 150 to operate as described below.

In one embodiment, each computer system 150 is a conventional Sun Microsystems Ultra 10 workstation running the Solaris operating system commercially available from Sun Microsystems of Mountain View, Calif., a Pentium-compatible personal computer system such as are available from Dell Computer Corporation of Round Rock, Tex. running a version of the Windows operating system (such as 95, 98, Me, XP, NT or 2000) commercially available from Microsoft Corporation of Redmond Wash. or running the FreeBSD operating system commercially available from the Web site freebsd.org, or a Macintosh computer system running the MacOS or OpenStep operating system commercially available from Apple Computer Corporation of Cupertino, Calif. and the Netscape browser commercially available from Netscape Computer Corporation of Mountain View, Calif. although other systems may be used.

Figure 2:
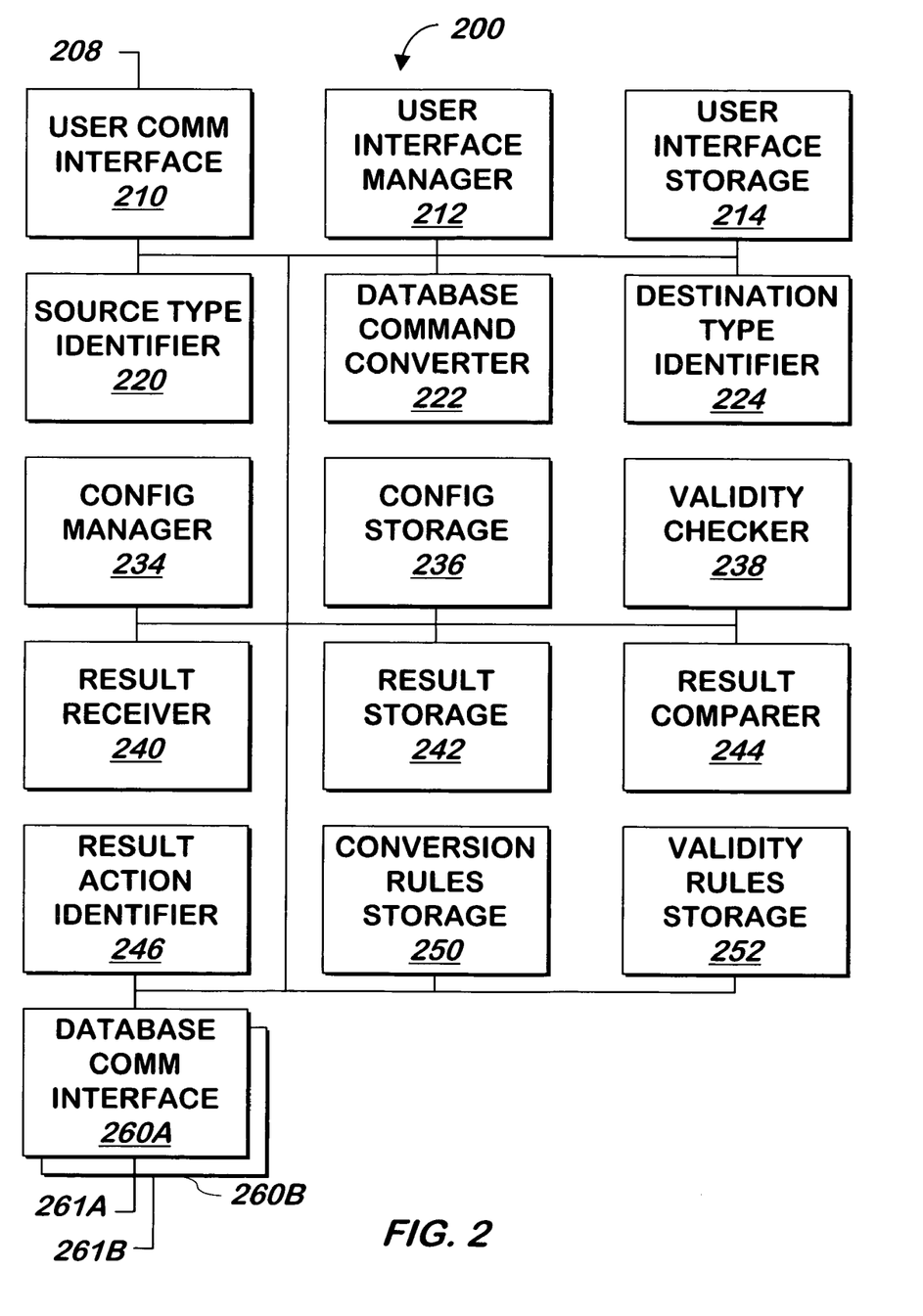
FIG. 2 is a block schematic diagram of a system for converting database commands and verifying the results of conversion according to one embodiment of the present invention.

Referring now to FIG. 2, a system 200 for converting database commands and verifying the results of the conversion is shown according to one embodiment of the present invention. In one embodiment, all user input and output is made via input/output 208 of user communication interface 210 which is coupled to a monitor, printer, keyboard, mouse, and other conventional user input and/or output devices or coupled to a network such as the Internet or a local area network or any combination of the above. User communication interface 210 includes a conventional input/output interface and associated device drivers and may include a conventional communication interface that supports Ethernet, TCP/IP, or other conventional communication protocols.

As will be described in more detail below, system 200 communicates with one or more database programs that support database command languages such as SQL. Each of the one or more database programs may support a different dialect of the same database language, or different database language. The user enters a database query, update or other command in a database language or dialect of the database language that may or may not be the same as a database language supported by any of the database programs to which the command may be sent. System 200 receives the command and identifiers of database programs designated by the user on which the user desires the command to be executed, copies or reformats the command into the correct language or dialect for each designated database system, and for each database program, forwards the command copied or reformatted for that database system to that database system for execution.

System 200 receives the results of the execution of the command from each database program, compares each result to a known good result or one result or every other result, and reports on any discrepancies. If there are no discrepancies, system 200 commits any updates that resulted from the commands. If there are discrepancies, then system 200 determines if the discrepancies may be acceptable to the user. If the discrepancies are not those that may be acceptable, system 200 notifies the user and rolls back the updates. If the discrepancies may be acceptable to the user, system 200 notifies the user and allows the user to determine whether to commit the results or roll them back.

In one embodiment, system 200 may communicate with local or remote database programs. A local database program is a database program that runs on the same computer system as the computer system with which the user communicates without the use of other computer systems, and a remote database program is a database program that runs on any other computer system.

In one embodiment, during configuration and set-up of system 200, the user provides to configuration manager 234 certain configuration parameters and options that include, among other things, the URLs of databases that are connected and available to system 200, and optionally a nickname for each database, such as "Customer List" or "Inventory". As described herein, a database URL and/or a nickname is used to identify each database, although any other type of identifier may be used to identify the database. The user provides such available database URLs and nicknames in a conventional manner by means of user interface manager 212 (described below), user communication interface 210, and input/output 208 and configuration manager 234 stores this information in configuration storage 236.

In another embodiment, configuration manager 234 requests the list of URLs and optionally, nicknames, from operating system (not shown), or requests the URLs from operating system and allows nicknames to be provided by the user, and stores the nicknames associated with the URLs as described above.

To request the conversion of a command, the user uses user interface manager 212, which provides a user interface such as a menu or other similar interface to accept requests from the user. When user interface manager 212 receives such a request, user interface manager 212 signals configuration manager to provide the URLs and optionally, the nicknames. Configuration manager 234 sends a list of available database URLs and nicknames from configuration storage 236 to the requester, which in this case is user interface manager 212. User interface manager 212 receives the list of available database URLs and nicknames, formats the list, and provides the formatted list of available database URLs and their associated nicknames to the user's display via user communication interface 210 and input/output 208. In one embodiment, user interface manager 212 only displays the database nicknames. User interface manager 212 then allows the user to designate the databases the user would like to use to execute one or more commands provided as described below.

To designate the databases which the user would like to execute the one or more commands, the user selects one or more database URLs, or selects one or more database nicknames, or selects a combination of database URLs database nicknames from the list of available database URLs and nicknames presented on the user's display. In one embodiment, the user may optionally enter additional database URLs for one or more databases that the user wishes to include in the list of available database URLs to execute one or more commands. The URLs designated by, or received from, the user are stored by user interface manager 212 in user interface storage 214 as entries in a "designated databases table". In one embodiment, user interface manager 212 allows the user to enter a user identifier and password for each database designated as described above and user interface manager 212 stores the user identifier and password associated with the corresponding entry in the designated databases table.

In addition to designating one or more databases to which the user would like to convert one or more commands, the user also uses user interface manager 212 to identify the one or more commands. The one or more commands may be retrieved from a file or entered by the user. To retrieve the one or more commands from a file, the user identifies the file to user interface manager 212 using a conventional file open dialog box. In one embodiment, user interface manager 212 reads the file and displays the commands in the file. The user may then designate one or more of the commands displayed that the user wishes system 200 to convert. Alternatively, the user types the one or more commands using a conventional database language, such as SQL, into a conventional text box provided by user interface manager 212. User interface manager 212 stores the one or more commands in user interface storage. The description below describes a single command being entered or designated, however, if multiple commands are entered or designated, the commands are processed one at a time as described below.

In one embodiment, the user may also select an indication of what language and/or dialect in which the one or more database command is known to be valid from a table of languages and dialects described below as the available languages table stored in user interface storage 214 and provided by user interface manager 212. User interface manager 212 stores the indication of the language and/or dialect of the one or more commands into user interface storage 214 as the database command language indicator.

In one embodiment, the table of languages and dialects, referred to herein as the "available languages table", contains entries, with one entry for each of the languages and dialects from which commands may be converted, or to which commands may be converted, or both. An optional "from" field and an optional "to" field indicates whether commands may be converted from the language and dialects, or to the language and dialect, respectively, and both fields may be marked as true. In another embodiment, all commands from any language and dialect on the list are convertible into any other language and dialect on the list and so the "from" and "to" fields are not used. In still another embodiment, commands from some languages on the list may be converted into some of the other languages on the list, and so each language on the list from which commands may be converted references the other languages into which commands in that language and/or dialect may be converted. The available languages table may be supplied as part of system 200 and stored in user interface storage 214.

In one embodiment, if the user provides an indicator of the language and/or dialect of the command, user interface manager 212 signals destination type identifier 224 to continue the conversion process as described below. If the user does not provide a database command language indicator or in another embodiment, whether or not the user provides it, user interface manager 212 sends the database command to source type identifier 220 in order to automatically identify all of the languages and/or dialects in which the command is valid.

To automatically identify the language and/or dialect of the command, source type identifier 220 checks the validity of the database command in one or more languages corresponding to the available languages table as will now be described.

Source type identifier 220 selects the first entry from the available languages table in command/language storage 232, and sends the database command received from user interface manager and the language identifier in the selected entry to validity checker 238.

Validity checker 238 receives the database command and the selected language identifier, and locates a set of rules corresponding to the language identifier it receives from a group containing a set of rules for each language and dialect from which system 200 is able to translate in validity rules storage 252. Validity checker 238 then uses the located rule to determine whether or not the database command is valid in the language indicated by the language identifier received. The rules are conventional syntax rules that allow validity checker 238 to determine whether the database command meets the syntax rules of the language and dialect. If validity checker 238 determines that the database command is valid for the language and dialect received, then validity checker 238 sends a "valid" object to source type identifier 220; otherwise, validity checker 238 sends an "invalid" object to source type identifier 220.

Source type identifier 220 receives the object and examines it. If source type identifier 220 receives a "valid" object, source type identifier 220 copies the database command to the available languages entry in the available languages table having a language identifier matching the one it received.

After performing the operations above, or if source type identifier receives a "not valid" object, if there are any unselected entries in the available languages table, source type identifier 220 selects the next entry from the available languages table in user interface storage 214, and continues as described above until source type identifier 220 has validated the database command in every language represented in the available languages table, and stored the database command in the available languages table along with the entry or entries having the language identifiers corresponding to the languages in which the database command is valid.

If source type identifier 220 selects and sends every language identifier in the available languages table as described above without receiving a "valid" object in response to at least one language indicator from which commands may be converted, source identifier 220 sends an error message to the user via user interface manager 212, user communication interface 210, and input/output 208.

After source identifier 220 has processed each entry in the available languages table as described above, source identifier 220 signals destination type identifier 224.

Destination type identifier 224 receives the signal and determines, by means of an interface call, the language and/or the dialect used to process commands by each database program referred to by the designated databases table in user interface storage 214. To determine the languages and/or the dialects, destination type identifier 224 selects the first URL in the designated databases table and establishes a connection with the database referred to by the selected URL as described in more detail below. The database referred to by the selected URL is herein referred to as the selected database.

Database communication interface 260A is a conventional communication interface that connects to one or more databases. In one embodiment, all database communications in to or out of system 200 is made via database communication interface 260A and input/output 261A, which is coupled to a network such as the Internet or a local area network or both. In one embodiment, database communication interfaces 260A and 260B include a conventional JDBC-compatible or ODBC-compatible driver that can communicate with one or more types of database programs.

In one embodiment, database communication interface 260A can communicate successfully only with one particular kind or brand of database. In such embodiment, database communication interface 260B can communicate successfully with a kind or brand of database that is different from the kind or brand of database with which database communication interface 260A communicates. For example, database communication interface 260A may be used to communicate with an MS SQL database program, and database communication interface 260B may be used to communicate with IBM's DB2 database program. Although only two database communication interfaces 260A-B are shown on FIG. 2, any number of such communication interfaces may be used.

In one embodiment with multiple database communication interfaces 260A-B, destination type identifier 224 establishes a connection with the database program referred to by the selected URL by sending the selected URL to each of database communication interfaces 260A-B, and allowing whichever of database communication interface 260A-B that is able to communicate with the database program referred to by the selected URL to perform that communication. If one or more of database communication interface 260A-B cannot successfully communicate with a given URL, then that particular database communication interface 260A-B ignores and discards the URL. In another embodiment, each database communication interface 260A-B is configured to communicate with only one database, and the URL of each such database is stored in a registry along with an identifier of the interface 260A-B. Destination type identifier 224 uses the registry entries to match the URL to which it wishes to connect with the URL in the registry in order to select the proper database communication interface 260A-B with which to connect to the selected database. In still another embodiment, the database communication interface 260A-B to use with each database program is manually-associated with each database entry in the available databases table in user interface storage 214 when the databases are identified to the table, and destination type identifier uses the associated database communication interface 260A-B.

Once destination type identifier 224 has established a connection with the selected database via one of the database communication interfaces 260A-B as described above, destination type identifier 224 requests the language and/or the dialect from the selected database. In one embodiment, destination type identifier 224 uses a JDBC call to retrieve and examine the DatabaseMetaData object for the selected database to determine the language and/or the dialect of that database.

In another embodiment, destination type identifier 224 requests and receives other meta-information from the database, such as the manufacturer and version number, for example, using the DatabaseMetaData object or other conventional techniques. In such embodiment, the available languages table uses some or all of the meta-information (e.g. manufacturer and version number) as the language identifier.

Destination type identifier 224 receives the language and/or dialect or other indication of the language and/or dialect such as manufacturer and version number of the selected database program, and constructs a language identifier in such a way that the language identifier uses a defined value corresponding to a database language and/or dialect in the available languages table. Destination type identifier 224 stores the language identifier along with the database URL in the designated databases table entry for the selected database in user interface storage 214. These entries, which may consist of a database URL, a language identifier, and optionally a user identifier and password are herein referred to as designated database entries.

Destination type identifier 224 selects the next database program in the designated databases table, establishes a connection, and identifies the language identifier of that database program as described above and continues selecting additional designated databases table entries until the language identifiers have been identified for all databases corresponding to URLs in the designated databases table in user interface storage 214. Once destination type identifier 224 has identified and stored a language identifier for each database entry, destination type identifier signals user interface manager 212.

User interface manager 212 signals database command converter 222 to translate the database command, if necessary, to the languages and/or dialects of the database entries. As described above, each entry in the designated databases table in user interface storage 214 contains the URL of a database that the user wishes to send a database command to, a language indicator, and optionally a user identifier and password. Each available languages entry in command/language storage 232 contains a language identifier, and contains the database command if the unconverted database command is valid in the language indicated by the language identifier. The use of these two data structures and the procedure described below allows the minimum number of conversions to-take place the minimum number of times. However, any other way of converting the command received from the user into the languages and dialects of the databases in the designated databases table may be used according to other embodiments of the present invention.

In one embodiment, to translate the database command, user interface manager 212 selects the first database entry from user interface storage 214, selects the language indicator in the selected database entry, and selects the first entry from the available languages table in user interface storage 214. User interface manager 212 compares the selected language indicator to the language indicator from the selected available languages entry. If the two language indicators match, then user interface manager 212 examines the selected available languages entry to see if it contains a database command.

If the selected available languages entry contains a database command, then the database command does not need to be translated to the language and/or dialect indicated by the selected language identifier because it is already valid in that language and dialect, so user interface manager 212 marks the entry in the available languages table and selects the next database entry from the designated databases table, selects the first available languages entry, and continues as described above.

If the two language indicators do not match, then user interface manager 212 selects the next available languages entry, compares the selected language indicator to the language indicator from the selected available languages entry, and continues as described above until user interface manager 212 finds a available languages entry with a language indicator that matches the selected language indicator.

If the matching selected available languages entry does not contain a database command, then user interface manager 212 converts the database command to the language and/or dialect indicated by the selected language identifier. To convert the database command, user interface manager 212 scans the available languages table for the first entry in which the command was valid that can be converted into the language corresponding to the selected language identifier, and sends to database command converter 222 the corresponding language indicator as the source language indicator, the selected language indicator as a destination language indicator, and the database command. If no such source language identifier may be located, user interface manager 212 alerts the user and allows the user to remove the selected database entry from the designated database table, designate a language to which the command may be converted as described herein, or provide the command to be executed on that database, which user interface manager 212 stores in an available languages table entry corresponding to the language indicator of the selected available languages entry.

Database command converter 222 receives the database command, the source language indicator, and the destination language indicator, and uses a set of conversion rules in conversion rules storage 250 to convert the database command from the language indicated by the source language indicator to the language indicated by the destination language indicator. Appendix A and Appendix B contain example descriptions of the rules in conversion rules storage 250 although any number of rules may be used containing a more thorough or less thorough set of rules. Database command converter 222 sends the converted database command and the destination language indicator to validity checker 238.

Validity checker 238 receives the converted database command and the destination language indicator and uses the rules in validity rules storage 252 to determine if the converted database command is valid in the language and/or dialect corresponding to the destination language indicator as described above. Validity checker 238 sends either a "valid" or "invalid" object, as described above, to database command converter 222.

Database command converter 222 receives the object and examines it. If "invalid", database command converter 222 sends an explanatory message to the user via user communication interface 210 and input/output 208 and terminates, in one embodiment. In another embodiment, if the received object is "invalid", database command converter 222 signals user interface manager 212 to display the original and converted command and allow the user to change the invalid converted command and repeats checking the validity as described above. If the object indicates "valid", database command converter 222 stores the converted database command into the selected available languages entry in command/language storage 232, marks the entry, and signals user interface manager 212.

User interface manager 212 receives the signal, selects the next entry from the designated databases table in user interface storage 214, selects the first available languages entry from command/language storage 232, and continues as described above until user interface manager 212 has ensured that the database command has been converted into all of the languages represented within the designated databases table.

In one embodiment, once user interface manager 212 has converted the database command to all languages and/or dialects used by the databases corresponding to the designated database-table, user interface manager 212 displays the list of converted commands from the available languages table entries that were marked as described above and allows the user to modify them. In order to allow the user to modify the converted commands, user interface manager 212 formats the converted database commands and their associated language indicators in the converted command list in user interface storage 214 and sends the formatted converted database commands and associated language indicators to the user's display via user communication interface 210 and input/output 208. User interface manager 212 may also list the nicknames of the databases in the designated databases table that use languages corresponding to the language corresponding to the command so that the user may view the database or databases for which the converted command is proposed.

The user may elect to alter one or more of the converted database commands, or to accept all converted database commands as they are displayed. If the user elects to alter one or more converted database commands, the user enters them in a user interface provided by user interface manager 212, which receives them and internally stores them in a working area.

In one embodiment, user interface manager 212 stores the altered converted database commands in place of the corresponding converted command in the list of available languages to allow the user to override system 200. In another embodiment, user interface manager 212 receives the altered converted database commands and their associated language indicators, and selects the first altered converted database command and its associated language indicator. User interface manager 212 sends the selected altered converted database command and language indicator to validity checker 238; validity checker 238 returns a "valid" or "invalid" object as described above. User interface manager 212 receives and examines the returned object. If the received object is "invalid", user interface manager 212 sends an appropriate error message to the user's display via user communication interface 210 and input/output 208 and allows the user to alter it again as described above or return it to its converted but unaltered state. If the received object is "valid", user interface manager 212 uses the selected language indicator to locate the available languages entry in command/language storage 232, and replaces the converted database command with the altered converted database command in the located available languages entry.

User interface manager 212 selects the next altered converted database command and its associated language indicator, sends the selected altered converted database command and language indicator to validity checker 238, and continues as described above until user interface manager 212 has validated every altered converted database command, and stored every validated altered converted database command in the correct available languages entry in command/language storage 232.

Once user interface manager 212 has converted the database command to each required language, allowed the user to edit the converted commands, and optionally validated any altered converted commands, user interface manager 212 sends-the proper conversion of the database command to each of the databases that the user has chosen.

To send the proper conversion to each chosen database, user interface manager 212 selects the first database entry from the designated databases table in user interface storage 214 and selects the language indicator from the selected entry. User interface manager 212 uses the selected language indicator as an index into the available languages table in command/language storage 232 to locate an available languages entry containing the identical language indicator, and selects the copied or converted database command from the available languages entry.

User interface manager 212 sends the selected copied or converted database command to the database program referred to by the URL from the selected database entry via database communication interface 260A-B and input/output 261A-B. In the embodiment where each database URL has an associated user identifier and password, user interface manager 212 sends the user identifier and password associated with a particular URL along with every command that user interface manager 212 sends to that URL or sends a separate login command, if necessary before sending the copied or converted command to that database.

The database program computes a result, and returns the result to database communication interface 260A-B, which forwards the result and the URL of the database from which it was produced to result receiver 240. The database program may be any conventional database program, such as Oracle 9i or others commercially available from Oracle Corporation of Redwood Shores, Calif., DB2 commercially available from IBM Corporation of Armonk, N.Y., or SQL Server commercially available from Microsoft Corporation of Redmond, Wash. Result receiver 240 receives the result and the database URL, stores the result in result storage 242 indexed by the database URL, and signals user interface manager 212.

User interface manager 212 receives the signal and selects the next database entry from the designated databases table in user interface storage 214, selects the language indicator from the selected entry, and continues sending database commands as described above until user interface manager 212 has sent the proper copied or converted database command to each database referenced in the designated databases table, and result receiver 240 has stored the result received in result storage 242 as described above. When, upon receiving the signal from result receiver 240, user interface manager 212 determines that there are no additional database entries in the designated database table in user interface storage 214, user interface manager 212 signals result comparer 244.

The results received as described above are then compared as described below. In one embodiment, one result is identified as a known good result and the other results are compared against the known good result. The known good result may be a result from a database designated by the user when the user identified the designated databases as described above (in which case, a flag is stored in the designated database table by user interface manager 212), it may be received from a database using a language and dialect for which no conversion of the command received from the user was required, (in which case source type identifier 220 stores an indication that no conversion was required in the available languages table corresponding to each such language) or it may be from the first database in the designated database table. In another embodiment, each result is compared against every other result.

Result comparer 244 receives the signal, compares the various results in result storage 242 using any of the comparison procedures just described, and identifies any discrepancies. To compare results, result comparer 244 chooses the database entry corresponding to the known good database from user interface storage 214, extracts its URL, and uses the URL to locate the result of the converted database command on the first database in result storage 242, herein referred to as the primary result. Result comparer 244 selects the next database entry, extracts its URL, and uses the URL to locate the result of the converted database command on the second database in result storage 242, herein referred to as the secondary result. Result comparer 244 clears a "row change" flag, if set, and deletes any list of row identifiers from storage internal to result comparer 244.

Result comparer 244 selects the first row of the primary result in result storage 242, selects the first row of the secondary result in result storage 242, and compares the two selected rows. If the two rows are identical, result comparer 244 marks each of the two rows, selects the first unmarked row of the primary result, selects the first unmarked row of the secondary result, and repeats the comparison process until the selected row in each result does not match or there are no more rows in either the primary result or the secondary result.

If result comparer 244 determines that the two rows are not identical, result comparer 244 stores identifiers (such as the row numbers) of the two different rows in a list in storage internal to result comparer 244 and sets the "row change" flag. Result comparer 244 selects from the secondary result the next unmarked row that has not yet been compared to the selected primary result row, compares the two selected rows, and repeats the process until the two selected rows match or there are no additional rows in the secondary result.

If result comparer 244 locates a row in the secondary result that is identical to the selected row in the primary result, result comparer 244 marks the two rows, selects the next row in the primary result and repeats the process of locating a matching row in the secondary result as described herein.

If result comparer 244 determines that the two rows are not identical and there are no more unmarked rows that have not yet been compared to the selected primary result row, result comparer 244 sends the URL of the primary result, the URL of the secondary result, and a "different" object to result action identifier 246, then continues as described below.

If result comparer 244 determines that there are no more rows left unselected in the primary result, result comparer 244 scans both the primary result and the secondary result looking for unmarked rows. If result comparer 244 finds any unmarked rows in either result then result comparer 244 sends the URL of the primary result, the URL of the secondary result, and a "different" object to result action identifier 246, and continues as described below. If result comparer 244 does not find any unmarked rows, then result comparer 244 checks the status of the "row change" flag. If set, result comparer 244 sends the URL of the primary result, the URL of the secondary result, the list of row identifiers from storage internal to result comparer 244, and a "row change" object to result action identifier 246, and continues as described below. If the "row change" flag is not set, result comparer 244 sends the URL of the primary result, the URL of the secondary result, and a "identical" object to result action identifier 246.

Once result comparer 244 has compared the primary result to the secondary result and sent the appropriate object to result action identifier 246, result comparer 244 selects the next unselected database entry, extracts its URL, and uses the URL to locate the result, which is the new secondary result. Result comparer 244 clears the "row change" flag and deletes any row identifiers as described above, and then compares the primary result to the secondary result as described above, sends a pair of URLs and a object to result action identifier 246, and continues comparing the primary results to the new secondary result and selecting a new secondary result as described above until result comparer 244 has selected the last unselected database entry and compared its result to the primary result.

Once result comparer 244 has compared the primary result to the result of the execution of a converted database command on every other database, result comparer 244 signals result action identifier 246.

In one embodiment, after result comparer 244 has compared the primary result to all of the other results stored in result storage 242, result comparer 244 selects another database entry from the designated database table as the primary result, and continues comparing results of other databases corresponding to entries below the primary result in the designated databases table until result comparer 244 has compared each result to every other result, sent a object and a pair of URLs for each comparison made to result action identifier 246, and signaled result action identifier 246 as described above.

Result action identifier 246 receives each pair of URLs and the associated object, and examines each object. If the object is "row change", result action identifier 246 receives the list of row identifiers, and stores the pair of URLs, object, and the list of row identifiers in a table internal to result action identifier 246. If the object is not "row change", then result action identifier 246 stores the pair of URLs and the object in the table internal to result action identifier 246.

When signaled by result comparer 244, result action identifier 246 receives the signal, examines the objects in the internal table indicating the results of the comparisons, and notifies the user of any discrepancies.

After result action identifier 246 has received the signal, result action identifier 246 examines each object in the internal table and decides whether or not to commit the changes made, if any, by the execution of the database commands. In order to make this decision, result action identifier 246 first retrieves the database command from user interface storage 214 and examines it. If the database command contains, as a substring, "insert", "update", "delete", or any combination of these, in any combination of upper- or lower-case characters, then the database command, if successful, will change the databases, so result action identifier 246 will either commit or roll back the command. Result action identifier 246 examines each object in the table internal to result action identifier 246. If any object is "different", then result action identifier 246 notifies the user and sends a "roll back" command to each database in the designated databases table; if all objects are "identical", then result action identifier 246 sends a "commit" command to each database in the designated databases table.

To send either a "commit" or "roll back" command to each database, result action identifier 246 selects the first database entry from the designated databases table in user interface storage 214, extracts its language identifier, and uses the extracted language identifier as an index into a table stored internally to result action identifier 246 that contains the proper syntax of the "commit" and "roll back" commands for the language and/or dialect of the database referred to by the URL in the database entry. Result action identifier 246 selects either the "commit" or "roll back" command from the table entry and sends it to the database referred to by the URL in the database entry via database communication interface 260A-B and input/output 261A-B in a similar manner to the way that user interface manager 212 sends converted database commands as described above.

Result action identifier 246 selects the next database entry from the designated databases table user interface storage 214 and continues sending either a "commit" or a "roll back" command until result action identifier 246 has sent a "commit" command to every database referred to in the designated databases table in user interface storage 214 or a "roll back" command to every database referred to in the designated databases table in user interface storage 214.

If at least one object is "row change" and none are "different", then result action identifier 246 uses the table within result action identifier 246 to display information about the results to the user. To display this information, for each pair of URLs with an associated object of "identical", result action identifier 246 formats the pair of URLs with a message indicating that the URLs produced identical results, and provides this message to the user via user interface manager 212.

In one embodiment, result action identifier 246 uses each URL as an index into the list of available database URLs and nicknames in configuration storage 236, and looks up the database nickname associated with each URL. In such embodiment, result action identifier 246 formats the database nicknames and the message as described above, and provides this message to the user via user interface manager 212.

For each pair of URLs with an associated object of "row change", result action identifier 246 uses each URL to retrieve the associated result from result storage 242 as described above, uses the row indicators to retrieve the different rows, formats the URLs or nicknames and retrieved rows, and sends the URLs or nicknames and retrieved rows as a message to the user via user interface manager 212.

Result action identifier 246 also sends a message via user interface manager 212 prompting the user to either "commit" or "roll back" the changes. In one embodiment, changes are either committed or rolled back to all of the databases, and in another embodiment, the user may select such actions for each entry in the designated databases table. The user replies to this message via user interface manager 212 by selecting the desired action, and result action identifier 246 receives and examines the reply, and sends either a "commit" command or a "roll back" command corresponding to the user's reply to each database program or all database programs as described above.

In one embodiment, when result action identifier 246 examines each object in the internal table, result action identifier 246 determines that there is at least one "different" object, result action identifier 246 notifies the user of the difference and prompts the user to provide a "commit" or "roll back" reply as described above, and then sends a "commit" command or a "roll back" command to each database referred to in the designated databases table in user interface storage 214 as described above.

If, after examining the database command, result action identifier 246 determines that the database command does not contain "insert", "update", or "delete" as described above, result action identifier 246 displays information as described above about identical and row change results, but does not send any "commit" or "roll back" commands to the database, and does not prompt the user for a "commit" or "roll back" reply.

Figure 3A:
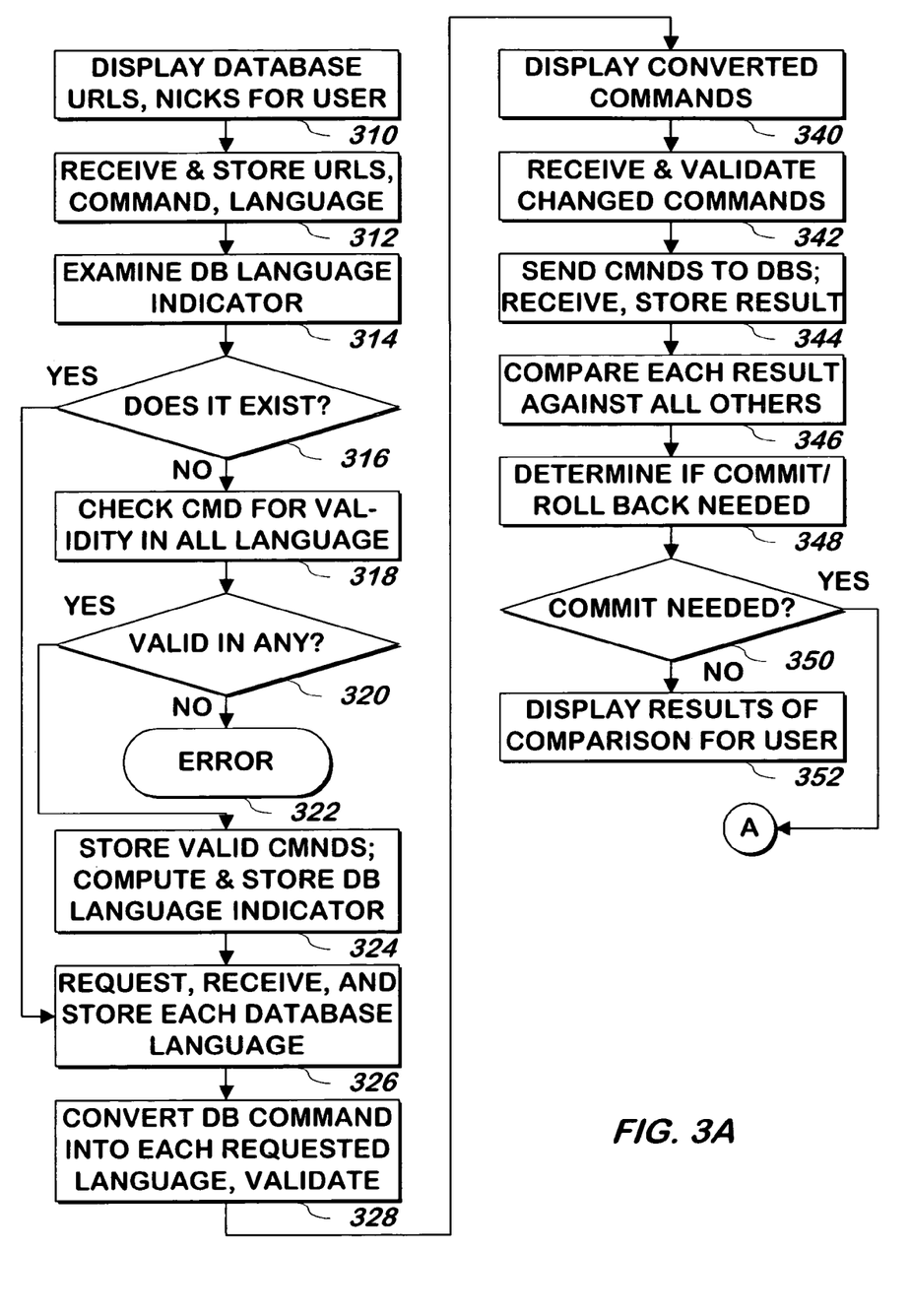
FIG. 3, consisting of FIG. 3A and FIG. 3B, is a flowchart illustrating a method of converting database commands and verifying the results of the conversion according to one embodiment of the present invention.
Figure 3B:
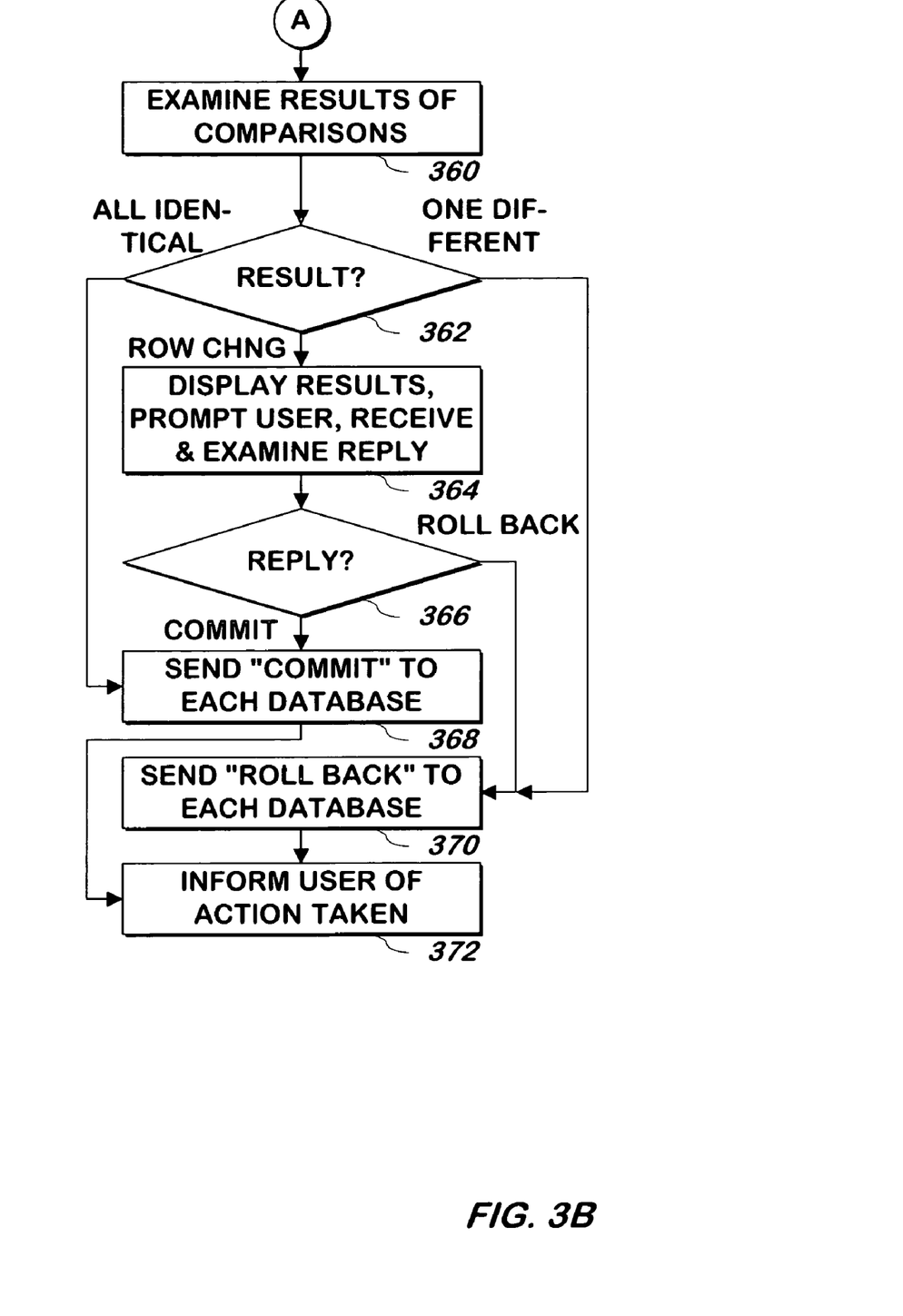

Referring now to FIG. 3, consisting of FIG. 3A and FIG. 3B, a method of converting database commands and verifying the results of the conversion is shown according to one embodiment of the present invention. A list of database URLs and/or nicknames is formatted and displayed 310 for the user, and the user's designated URLs and/or nicknames, a database command, and an optional database command language indicator are received 312 and stored as described above.

The database command language indicator is examined 314 as described above. If the database command language indicator was provided 316, the method continues with step 326 below; if the database command language indicator was not provided 316, then the command is checked 318 for validity in supported languages as described above. In one embodiment, step 318 is performed unconditionally after step 314 and step 316 is not provided.

If the command is not found valid in any language 320 then an error message is sent 322 to the user as described above and the method terminates. For each language and/or dialect in which the command is found valid, the command is stored along with the language identifier.

For each language in which the command is found valid 320, the command and the language indicator is stored 324 as described above. For the first language in which the command is found valid, a database command language indicator is constructed and stored as described above.

The language and/or dialect of each designated database is retrieved, for example, by requesting it as described above, and the languages are received and stored as described above 326. For databases in which the database command not determined to be valid as described above, the database command is converted 328 into the language of that database, and the converted commands are displayed 340 for the user to change as described above. Any converted commands changed by the user are received, optionally validated, and stored as described above 342.

Each designated database program is sent 344 the command or converted command corresponding to the language of that database as described above. Step 344 may include sending any or all of a username, password, or logon command to the database program or other application. The results are received and stored indexed by the URL of the associated database, and each stored result is compared 346 against a known good result or against all other results as described above.

The database command and result of the comparisons is examined 348 to determine if a commit or roll back is required as described above. If no commit or roll back is required 350, then the results of the comparison are displayed 352 for the user as described above and the method terminates.

If a commit or roll back is required 350, then the method continues at step 360 on FIG. 3B.

Continuing now with step 360 on FIG. 3B, the results of the comparisons of step 346 are examined 360 as described above. If each result is identical to every other result 362 as described above, then the method continues with step 368 below. If any result differs by more than a row reordering 362, then the method continues with step 370 below. If all results are either identical or they are identical or differ only by a row reordering 362, then the results are displayed 364 for the user, the user is prompted to either commit or roll back, and the user's reply is received and examined as described above.

If the user's reply is "commit" 366, then a commit is sent 368 to each database as described above and the method continues with step 372 below. If the user's reply is "roll back" 366, then a roll back is sent 370 to each database as described above and the method continues with step 372.

Continuing now with step 372, the user is informed 372 as to the action taken as described above, and the method terminates.

APPENDIX A

Conversion from MS SQL to DB2 (UDB)

A database command in MS SQL is received and converted to the equivalent command in DB2. First, square brackets ([. . . ]) enclosing complex identifiers are translated to double quotes (". . . "). For example,
SELECT*FROM [customer invoices]
becomes
SELECT*FROM "customer invoices"
Identifiers containing a non-alphabetic character as the first character are also enclosed with double quotes:
SELECT*FROM_Test
becomes
SELECT*FROM "_Test"
Constraint names of a foreign or primary key on an ALTER command are converted to a shorter constraint name constructed of a two character prefix, the table name, and a number that is initially 1000 and is incremented by one for each such construction made. For example:
ALTER table test add CONSTRAINT very_long_constraint PRIMARY KEY(id)
becomes ALTER table test add CONSTRAINT PKtest1000 PRIMARY KEY(id)

Constraint names for CREATE INDEX commands are shortened in a similar manner to the way that constraint names for the ALTER command are shortened:

CREATE INDEX very_long_constraint_name ON test (id)

becomes

CREATE INDEX IXtest1000 ON test(id)

Data types are converted according to the following table. Data types not listed in the table remain unchanged:

| MS SQL Server | DB2 (UDB) |
|---|---|
| TINYINT | SMALLINT |
| SMALLMONEY | NUMERIC |
| MONEY | NUMERIC |
| SMALLDATETIME | TIMESTAMP |
| DATETIME | TIMESTAMP |
| TIMESTAMP | CHARACTER(8) |
| CHAR | CHARACTER(254) |
| NVARCHAR | VARCHAR(1000) |
| VARCHAR | VARCHAR(255) |
| BINARY | CHARACTER |
| VARBINARY | BLOB(10000) |
| BIT | CHARACTER(1) |
| TEXT | CLOB(10000000) |
| IMAGE | BLOB(10000000) |

APPENDIX B

Conversion from MS SQL to Oracle

A database command in MS SQL is received and converted to the equivalent command in Oracle. The conversion is done according to the following table:

| MS SQL | CONVERTED TO |
|---|---|
| CONVERT(type, value) | TO_CHAR(value) for type of varchar or char |
| | TO_NUMBER(value) for type of int, tinyint, smallint, real, decimal, numeric, or money |
| | TO_DATE(value) for type of datetime or timestamp |
| | HEXTORAW(value) for type of hexadecimal string |
| CAST (value AS type) | TO_CHAR(value) for type of varchar or char |
| | TO_NUMBER(value) for type of int, tinyint, smallint, real, decimal, numeric, or money |
| | TO_DATE(value) for type of datetime or timestamp |
| | HEXTORAW(value) for type of hexadecimal string |
| ISNULL( . . . ) | NVL( . . . ) |
| SUBSTRING( . . . ) | SUBSTR |
| PATINDEX( . . . ) | INSTR( . . . ) |
| CHARINDEX( . . . ) | INSTR( . . . ) |
| CHAR(number) | CHR(number) |
| LEFT(str, n) | SUBSTR(str, 1, n) |
| GETDATE( ) | SYSDATE |

Data types are converted according to the following table. Data types not listed in the table remain unchanged:

| MS SQL | CONVERTED TO |
|---|---|
| TINYINT | NUMBER, with length of 4 |
| SMALLINT | NUMBER, with length of 6 |
| INT | NUMBER, with length of 11 |
| NUMERIC | NUMBER |
| MONEY | |
| DECIMAL | |
| FLOAT | |
| REAL | |
| CHAR | VARCHAR2 |
| VARCHAR | |
| NVARCHAR | |
| IMAGE | LONG RAW |
| TEXT | LONG |
| TIMESTAMP | DATE |
| DATETIME | |
| SMALLDATETIME | |
| VARBINARY | RAW |

What is claimed is:

1. A method of verifying a conversion of at least one database command, comprising:
   converting from a first format to a second format the at least one command corresponding to an intended result;
   providing the at least one command in the second format to a first database program that will not execute, in a manner that produces the intended result, the command in the first format;
   receiving a first result from the first database program;
   providing to a second database program, different from the first database program, at least one selected from:
      the at least one command in the first format;
      at least one command in a third format converted from the first format; and
      the at least one command in the second format;
   receiving a second result from the second database program;
   comparing a content and row order of the first result and the second result;
   determining a validity of the command in the second format responsive to the comparing step; and
   operating a computer system responsive to the determining the validity step.

2. The method of claim 1 comprising the additional step of responsive to the comparison step, providing to at least one selected from the first database program and the second database program, at least one selected from a rollback command to roll back a database to a state prior to an execution of a prior command and a commit command to commit a result to a database.

3. The method of claim 2 wherein the providing at least one selected from the first database program and the second database program step comprises providing the rollback command responsive to the comparison step determining that at least one row of the first result is not contained in the second result.

4. The method of claim 2 wherein the providing at least one selected from the first database program and the second database program step comprises providing the commit command responsive to the comparison step determining that every row of the first result matches a different one of rows of the second result.

5. The method of claim 2 wherein the providing at least one selected from the first database program and the second database program step is responsive to a user directive responsive to the comparison step determining that:
every row of the first result matches a different one of rows of the second result; and
at least one row in the first result has in a different order in the first result than an order of the row in the second result matching said row in the first result.

6. The method of claim 1:
additionally comprising the step of receiving an identifier of the second format; and
wherein the command is converted from the first format to the second format responsive to the identifier of the second format received.

7. The method of claim 1 wherein the receiving the identifier step is responsive to a request for the type.

8. The method of claim 7 wherein:
the request is provided to the first database program; and
the identifier of the second format is received from the first database program.

9. The method of claim 1 wherein the command in the second format is determined to be valid responsive to the content and order of the first result identical to the content and order of the second result.

10. The method of claim 1 wherein the command in the second format is determined to be invalid responsive to the content of the first result different from the content of the second result.

11. The method of claim 1, wherein the providing to a second database program step comprises providing the at least one command in the first format.

12. The method of claim 1, wherein the providing to a second database program step comprises providing the at least one command in a third format converted from the first format.

13. The method of claim 1, wherein the providing to a second database program step comprises providing the at least one command in the second format.

14. A system for verifying a conversion of at least one database command, comprising:
a database command converter having an input for receiving the at least one database command in a first format, the database converter for converting from the first format to a second format the at least one command corresponding to an intended result, and for providing at an output the at least one database command in the second format;
a user interface manager having a first input coupled to the database command converter output for receiving the at least one database command in the second format, the user interface manager for providing at an output coupled to a first database program the at least one command in the second format to the first database program that will not execute, in a manner that produces the intended result, the command in the first format, the user interface manager additionally for providing to a second database program, different from the first database program, and coupled to the user interface manager output at least one selected from:
the at least one command in the first format received at a second input;
at least one command in a third format converted from the first format by the database command converter and provided at the database command converter output coupled to a third input; and
the at least one command in the second format received from the database command converter output coupled to the third input;
a result receiver having an input coupled to the first database program and the second database program, the result receiver for receiving a first result from the first database program and a second result from the second database program and providing the first result and the second result at an output;
a result comparer having an input coupled to the result receiver output, the result receiver for comparing a content and row order of the first result and the second result and providing an indication of said comparison at an output; and
a result action identifier having an input coupled to the result comparer output for receiving the indication, the result action identifier for determining a validity of the command in the second format responsive to the indication received at the result action identifier input.

15. The system of claim 14, wherein the result action identifier is additionally for, responsive to the indication received at the result action identifier input, providing at a second output coupled to at least one selected from the first database program and the second database program, at least one selected from a rollback command to roll back a database to a state prior to an execution of a prior command and a commit command to commit a result to a database.

16. The system of claim 15 wherein the result action identifier provides the rollback command to at least one selected from the first database program and the second database program responsive to the indication indicating at least one row of the first result is not contained in the second result.

17. The system of claim 15 wherein the result action identifier provides the commit command to at least one selected from the first database program and the second database program step responsive to the indication indicating that every row of the first result matches a different one of rows of the second result.

18. The system of claim 15 wherein the result action identifier provides the at least one selected from a rollback command to roll back a database to a state prior to an execution of a prior command and a commit command to commit a result to a database responsive to a user directive received at a user input of the result action identifier responsive to the comparison step determining that:
every row of the first result matches a different one of rows of the second result; and
at least one row in the first result has in a different order in the first result than an order of the row in the second result matching said row in the first result.

19. The system of claim 14:
additionally comprising a destination type identifier having an input, the destination type identifier for receiving an identifier of the second format and, responsive to the identifier received at the destination type identifier input, providing an indication of the second format at an output coupled to a type input of the database command converter; and
wherein the database command converter converts the command from the first format to the second format responsive to the indication of the second format received at the database command converter type input.

20. The system of claim 14 wherein the destination type identifier is additionally for providing at an output a request for the identifier of the second format.

21. The system of claim 20 wherein:
the destination type identifier output is coupled to the first database program and the request is provided to the first database program; and
the destination type identifier input is coupled to the first database program and the identifier of the second format is received from the first database program.

22. The system of claim 14 wherein the result action identifier determines the command in the second format is valid responsive to the indication indicating the content and order of the first result is identical to the content and order of the second result.

23. The system of claim 14 wherein the result action identifier determines the command in the second format is invalid responsive to the indication indicating the content of the first result different from the content of the second result.

24. The system of claim 14, wherein the user interface manager provides to the second database program coupled to the user interface manager output the at least one command in the first format received at a second input.

25. The system of claim 14, wherein the user interface manager provides to the second database program coupled to the user interface manager output the at least one command in the third format converted from the first format by the database command converter and provided at the database command converter output coupled to a third input.

26. The system of claim 14, wherein the user interface manager provides to the second database program coupled to the user interface manager output the at least one command in the second format received from the database command converter output coupled to the third input.

27. A computer program product comprising a computer useable medium having computer readable program code embodied therein for verifying a conversion of at least one database command, the computer program product comprising computer readable program code devices configured to cause a computer system to:
convert from a first format to a second format the at least one command corresponding to an intended result;
provide the at least one command in the second format to a first database program that will not execute, in a manner that produces the intended result, the command in the first format;
receive a first result from the first database program;
provide to a second database program, different from the first database program, at least one selected from:
the at least one command in the first format;
at least one command in a third format converted from the first format; and
the at least one command in the second format;
receive a second result from the second database program;
compare a content and row order of the first result and the second result;
determine a validity of the command in the second format responsive to the computer readable program code devices configured to cause the computer system to compare; and
operate the computer system responsive to the computer readable program code devices configured to cause the computer system to determine the validity.

28. The computer program product of claim 27 additionally comprising computer readable program code devices configured to cause the computer system to, responsive to the computer readable program code devices configured to cause the computer system to compare, provide to at least one selected from the first database program and the second database program, at least one selected from a rollback command to roll back a database to a state prior to an execution of a prior command and a commit command to commit a result to a database.

29. The computer program product of claim 22 wherein the computer readable program code devices configured to cause the computer system to provide at least one selected from the first database program and the second database program comprise the computer readable program code devices configured to cause the computer system to provide the rollback command responsive to the computer readable program code devices configured to cause the computer system to compare determining that at least one row of the first result is not contained in the second result.

30. The computer program product of claim 28 wherein the computer readable program code devices configured to cause the computer system to provide at least one selected from the first database program and the second database program comprise the computer readable program code devices configured to cause the computer system to provide the commit command responsive to the computer readable program code devices configured to cause the computer system to compare determining that every row of the first result matches a different one of rows of the second result.

31. The computer program product of claim 28 wherein the computer readable program code devices configured to cause the computer system to provide at least one selected from the first database program and the second database program are responsive to a user directive responsive to the comparison step determining that:
every row of the first result matches a different one of rows of the second result; and
at least one row in the first result has in a different order in the first result than an order of the row in the second result matching said row in the first result.

32. The computer program product of claim 27:
additionally comprising the computer readable program code devices configured to cause the computer system to receive an identifier of the second format; and
wherein the command is converted from the first format to the second format responsive to the identifier of the second format received.

33. The computer program product of claim 27 wherein the computer readable program code devices configured to cause the computer system to receive the identifier are responsive to a request for the type.

34. The computer program product of claim 33 wherein:
the request is provided to the first database program; and
the identifier of the second format is received from the first database program.

35. The computer program product of claim 27 wherein the command in the second format is determined to be valid responsive to the content and order of the first result identical to the content and order of the second result.

36. The computer program product of claim 27 wherein the command in the second format is determined to be invalid responsive to the content of the first result different from the content of the second result.

37. The computer program product of claim 27, wherein the computer readable program code devices configured to cause the computer system to provide to the second database program comprise computer readable program code devices configured to cause the computer system to provide to the second database program the at least one command in the first format.

38. The computer program product of claim 27, wherein the computer readable program code devices configured to cause the computer system to provide to the second database program comprise computer readable program code devices configured to cause the computer system to provide to the second database program at least one command in the third format converted from the first format.

39. The computer program product of claim 27, wherein the computer readable program code devices configured to cause the computer system to provide to the second database program comprise computer readable program code devices configured to cause the computer system to provide to the second database program the at least one command in the second format.

* * * * *